(12) United States Patent
Taghavi Nasrabadi et al.

(10) Patent No.: US 8,861,570 B2
(45) Date of Patent: Oct. 14, 2014

(54) METHODS AND APPARATUSES FOR BEACON TRANSMISSION

(75) Inventors: Mohammad Hossein Taghavi Nasrabadi, San Diego, CA (US); Avinash Jain, San Diego, CA (US); Hemanth Sampath, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 12/868,199

(22) Filed: Aug. 25, 2010

(65) Prior Publication Data

US 2011/0211616 A1 Sep. 1, 2011

Related U.S. Application Data

(60) Provisional application No. 61/300,870, filed on Feb. 3, 2010.

(51) Int. Cl.
| | |
|---|---|
| *H04B 1/00* | (2006.01) |
| *H04B 1/7183* | (2011.01) |
| *H04B 1/707* | (2011.01) |
| *H04J 13/00* | (2011.01) |

(52) U.S. Cl.
CPC .............. *H04B 1/707* (2013.01); *H04B 1/7183* (2013.01); *H04J 13/0014* (2013.01); *H04B 2201/70701* (2013.01)
USPC ........................................................ 375/146

(58) Field of Classification Search
USPC ........................................................ 375/146
See application file for complete search history.

(56) References Cited

U.S. PATENT DOCUMENTS

| 7,430,601 B2 | 9/2008 | Ayyagari et al. |
| 7,612,385 B2 * | 11/2009 | Kim et al. ........................ 257/99 |
| 7,724,767 B2 * | 5/2010 | Oksman ......................... 370/458 |
| 2003/0100343 A1 * | 5/2003 | Zourntos et al. ............... 455/562 |
| 2004/0203566 A1 * | 10/2004 | Leung ......................... 455/404.1 |
| 2005/0090241 A1 * | 4/2005 | Backes et al. .................. 455/418 |

(Continued)

FOREIGN PATENT DOCUMENTS

| CN | 1784860 A | 6/2006 |
| CN | 101222261 A | 7/2008 |

(Continued)

OTHER PUBLICATIONS

Hiroshi Harada., et al., "Merged Proposal: New PHY Layer Enhancement of MAC for mmWave System Proposal", IEEE 802.15-07-0934-01-003c, Nov. 2007.

(Continued)

*Primary Examiner* — Chieh Fan
*Assistant Examiner* — Santiago Garcia
(74) *Attorney, Agent, or Firm* — Steven R. Thiel

(57) ABSTRACT

Various methods and apparatuses for beacon transmission in an ad-hoc peer-to-peer network are disclosed. In one aspect, an apparatus for communication is disclosed, the apparatus comprising a processing system configured to determine device-independent beacon data, determine device-dependent beacon data, and to spread the device-dependent beacon data using one or more spreading codes and a transmitter configured to transmit one or more beacons during a beacon transmission period, wherein each beacon comprises the device-independent beacon data and the spread device-dependent beacon data.

29 Claims, 17 Drawing Sheets

(56) References Cited

U.S. PATENT DOCUMENTS

| | | | |
|---|---|---|---|
| 2006/0147018 A1* | 7/2006 | Gupta et al. | 379/211.02 |
| 2007/0140279 A1 | 6/2007 | Yang et al. | |
| 2008/0037431 A1* | 2/2008 | Werb et al. | 370/241 |
| 2008/0084350 A1* | 4/2008 | Uno et al. | 342/367 |
| 2008/0279214 A1 | 11/2008 | Doi et al. | |
| 2009/0022164 A1* | 1/2009 | Oksman | 370/400 |
| 2009/0122715 A1 | 5/2009 | Lakkis | |
| 2009/0196200 A1 | 8/2009 | Moritomo | |
| 2009/0213816 A1 | 8/2009 | Guo et al. | |
| 2009/0231194 A1* | 9/2009 | Uno et al. | 342/367 |
| 2009/0232126 A1 | 9/2009 | Cordeiro et al. | |
| 2009/0279523 A1 | 11/2009 | Doi et al. | |
| 2010/0091760 A1* | 4/2010 | Yoon | 370/350 |
| 2010/0150167 A1* | 6/2010 | Oksman | 370/458 |
| 2010/0199322 A1* | 8/2010 | Bennett et al. | 725/114 |
| 2011/0059689 A1* | 3/2011 | Haverty | 455/1 |
| 2011/0064072 A1* | 3/2011 | Wang et al. | 370/350 |
| 2011/0075642 A1 | 3/2011 | Cordeiro et al. | |
| 2011/0076955 A1* | 3/2011 | Uno et al. | 455/63.4 |
| 2011/0149798 A1 | 6/2011 | Cordeiro et al. | |
| 2011/0206017 A1* | 8/2011 | Taghavi Nasrabadi et al. | 370/336 |
| 2011/0211562 A1* | 9/2011 | Taghavi Nasrabadi et al. | 370/336 |
| 2011/0316676 A1* | 12/2011 | Bajic et al. | 340/10.33 |

FOREIGN PATENT DOCUMENTS

| | | |
|---|---|---|
| CN | 101326779 A | 12/2008 |
| CN | 101517930 A | 8/2009 |
| JP | 2004518353 A | 6/2004 |
| JP | 2004534441 A | 11/2004 |
| JP | 2006005620 A | 1/2006 |
| JP | 2007243749 A | 9/2007 |
| JP | 2007531374 A | 11/2007 |
| JP | 2008099255 A | 4/2008 |
| JP | 2008219554 A | 9/2008 |
| JP | 2009188680 A | 8/2009 |
| JP | 2009246955 A | 10/2009 |
| JP | 2011504016 A | 1/2011 |
| JP | 2011510535 A | 3/2011 |
| TW | 200707983 | 2/2007 |
| WO | WO-02058331 A2 | 7/2002 |
| WO | WO-02087266 A1 | 10/2002 |
| WO | WO-2005094007 A1 | 10/2005 |
| WO | 2008087600 A2 | 7/2008 |
| WO | 2008100078 A1 | 8/2008 |
| WO | 2009049217 | 4/2009 |
| WO | 2009061967 A1 | 5/2009 |

OTHER PUBLICATIONS

Hiroshi Harada, "IEEE 802.15-07-0761-10-003C Unified and flexible millimeter wave WPAN systems supported by common mode" TG3C—IEEE 802.15-07-0761-10-003C,, Sep. 18, 2007, pp. 1-62, XP002508475 the whole document pp. 37-39 Appendix I, II : pp. 59 and 60.

IEEE Standard for Information technology—Telecommunications and information exchange between systems—Local and metropolitan area networks—Specific requirements. Part 15.3: Wireless Medium Access Control (MAC) and Physical Layer (PHY) Specifications for High Rate Wireless Personal Area Networks, IEEE Standard, IEEE, Piscataway, NJ, USA, Oct. 12, 2009, pp. C1-187, XP017604237, ISBN: 978-0-7381-6050-4.

International Search Report and Written Opinion—PCT/US2011/023653—ISA/EPO—Apr. 20, 2011.

Kojima K., et al., "Necessary Modifications on Conventional IEEE802.15.3b MAC to Achieve IEEE802.15.3c Millimeter Wave WPAN", IEEE International Symposium on Personal, Indoor and Mobile Radio Communications. PIMRC, IEEE; PI, XX, Sep. 1, 2007, pp. 1-5, XP031168693, ISBN: 978-1-4244-1143-6.

Lakkis I., et al., "IEEE 802.15-0760-03-003c mmWave OFDM Physical Layer Proposal" IEEE 802.15 TG3C, Sep. 19, 2007, pp. 1-75, XP002507726.

Lan Z., et al., "On-demand device, discovery enhancement of IEEE802.15.3 MAC for 60GHz WPAN system", Personal, Indoor and Mobile Radio Communications, 2008. PIMRC 2008. IEEE 19th International Symposium on, IEEE, Piscataway, NJ, USA, Sep. 15, 2008, pp. 1-6, XP031371418, ISBN: 978-1-4244-2643-0.

Taiwan Search Report—TW100104136—TIPO—Aug. 5, 2013.

* cited by examiner

METHODS AND APPARATUSES FOR BEACON TRANSMISSION

CROSS-REFERENCE TO RELATED APPLICATIONS

This application claims priority under 35 U.S.C. §119(e) to U.S. Provisional Application No. 61/300,870, filed Feb. 3, 2010, which is hereby incorporated by reference in its entirety. This application is related to U.S. application Ser. No. 12/868,042 and U.S. application Ser. No. 12/868,153, filed concurrently with this application, which are both hereby incorporated by reference in their entirety.

BACKGROUND

1. Field

The present disclosure relates generally to communication systems, and more particularly, to the transmission of beacons.

2. Introduction

In order to address the issue of increasing bandwidth requirements that are demanded for wireless communications systems, different schemes are being developed to allow communication over one or more channels while achieving high data throughputs. These schemes may include protocols for transmission or reception of data and control information, forms of signal modulation, or utilization of a physical (PHY) layer and a Medium Access Control (MAC) layer.

SUMMARY

The systems, methods, apparatuses, and computer-readable mediums of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one of ordinary skill in the art will appreciate how the features of this invention provide for beacon transmission.

One aspect is a method of communication, the method comprising identifying a plurality of successive beacon transmission periods separated by at least one non-beacon transmission period, selecting one or more beacon transmission periods from the plurality of successive beacon transmission periods, and transmitting one or more beacons during each of the selected beacon transmission periods.

Another aspect is a method of communication, the method comprising sensing a channel during a first period comprising at least a first portion of a beacon transmission period, selecting, based on the sensing, a second period comprising at least a second portion of a beacon transmission period, and transmitting one or more beacons during the second period.

Another aspect is a method of communication, the method comprising determining device-independent beacon data, determining device-dependent beacon data, spreading the device-dependent beacon data using one or more spreading codes, and transmitting one or more beacons during a beacon transmission period, wherein each beacon comprises the device-independent beacon data and the spread device-dependent beacon data.

One aspect is an apparatus for communication, the apparatus comprising a processing system configured to identify a plurality of successive beacon transmission periods separated by at least one non-beacon transmission period and to select one or more beacon transmission periods from the plurality of successive beacon transmission periods and a transmitter configured to transmit one or more beacons during each of the selected beacon transmission periods.

Another aspect is an apparatus for communication, the apparatus comprising a processing system configured to sense a channel during a first period comprising at least a first portion of a beacon transmission period and select, based on the sensing, a second period comprising at least a second portion of a beacon transmission period, and a transmitter configured to transmit one or more beacons during the second period.

Another aspect is an apparatus for communication, the apparatus comprising a processing system configured to determine device-independent beacon data, determine device-dependent beacon data, and to spread the device-dependent beacon data using one or more spreading codes and a transmitter configure to transmit one or more beacons during a beacon transmission period, wherein each beacon comprises the device-independent beacon data and the spread device-dependent beacon data.

One aspect is an apparatus for communication, the apparatus comprising means for identifying a plurality of successive beacon transmission periods separated by at least one non-beacon transmission period, means for selecting one or more beacon transmission periods from the plurality of successive beacon transmission periods, and means for transmitting one or more beacons during each of the selected beacon transmission periods.

Another aspect is an apparatus for communication, the apparatus comprising means for sensing a channel during a first period comprising at least a first portion of a beacon transmission period, means for selecting, based on the sensing, a second period comprising at least a second portion of a beacon transmission period, and means for transmitting one or more beacons during the second period.

Another aspect is an apparatus for communication, the apparatus comprising means for determining device-independent beacon data, means for determining device-dependent beacon data, means for spreading the device-dependent beacon data using one or more spreading codes, and means for transmitting one or more beacons during a beacon transmission period, wherein each beacon comprises the device-independent beacon data and the spread device-dependent beacon data.

One aspect is a computer program product comprising a computer readable medium comprising instructions that when executed cause an apparatus to identify a plurality of successive beacon transmission periods separated by at least one non-beacon transmission periods, select one or more beacon transmission periods from the plurality of successive beacon transmission periods, and transmit one or more beacons during each of the selected beacon transmission periods.

Another aspect is a computer program product for communication comprising a computer readable medium comprising instructions that when executed cause an apparatus to sense a channel during a first period comprising at least a first portion of a beacon transmission period, select, based on the sensing, a second period comprising at least a second portion of a beacon transmission period, and transmit one or more beacons during the second period.

Another aspect is a computer program product comprising a computer readable medium comprising instructions that when executed cause an apparatus to determine device-independent beacon data, determine device-dependent beacon data, spread the device-dependent beacon data using one or more spreading codes, and transmit one or more beacons during a beacon transmission period, wherein each beacon comprises the device-independent beacon data and the spread device-dependent beacon data.

One aspect is a wireless node comprising a processing system configured to identify a plurality of successive beacon transmission periods separated by at least one non-beacon transmission period and to select one or more beacon transmission periods from the plurality of successive beacon transmission periods, at least one antenna, and a transmitter configured to transmit, via the at least one antenna, one or more beacons during each of the selected beacon transmission periods.

Another aspect is a wireless node comprising a processing system configured to sense a channel during a first period comprising at least a first portion of a beacon transmission period and select, based on the sensing, a second period comprising at least a second portion of a beacon transmission period, at least one antenna, and a transmitter configured to transmit, via the at least one antenna, one or more beacons during the selected period.

Another aspect is a wireless node comprising a processing system configured to determine device-independent beacon data, determine device-dependent beacon data, and to spread the device-dependent beacon data using one or more spreading codes, at least one antenna, and a transmitter configure to transmit, via the at least one antenna, one or more beacons during a beacon transmission period, wherein each beacon comprises the device-independent beacon data and the spread device-dependent beacon data.

BRIEF DESCRIPTION OF THE DRAWINGS

These and other sample aspects of the invention will be described in the detailed description that follow, and in the accompanying drawings.

Figure 1:
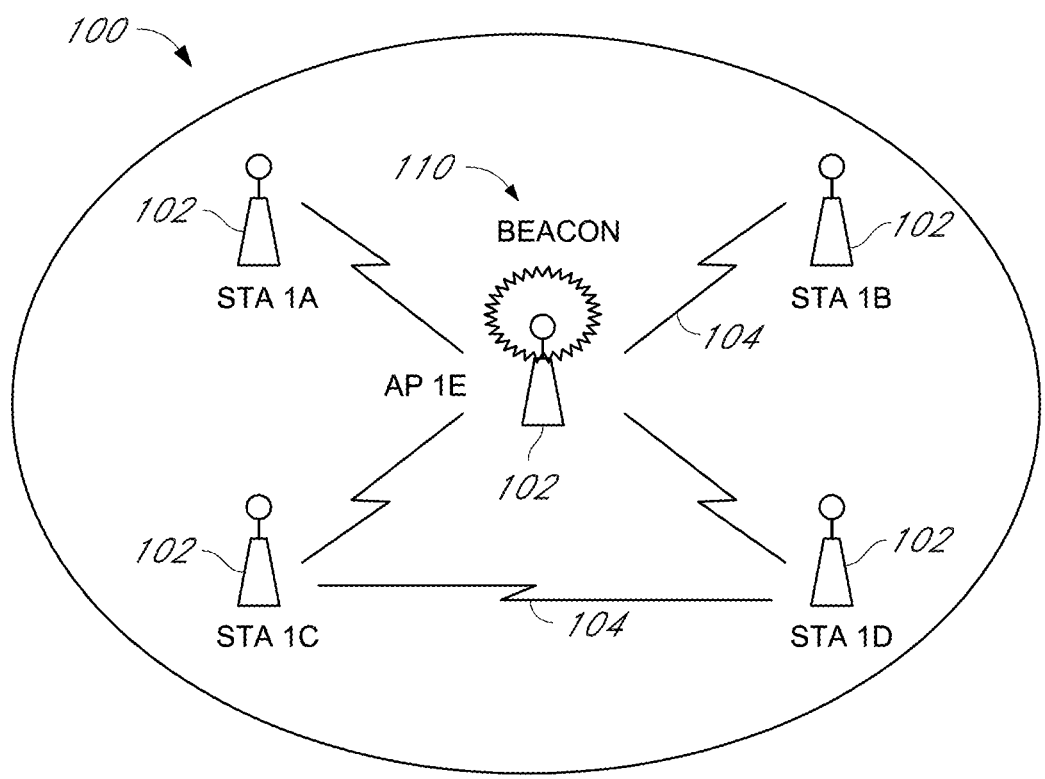
FIG. 1 illustrates a block diagram of a communication system according to an aspect.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus, device, system, method, or any other illustrated component or process. Like reference numerals may be used to denote like features throughout the specification and figures.

DETAILED DESCRIPTION

Various aspects of methods, systems, and apparatuses are described more fully hereinafter with reference to the accompanying drawings. These methods, systems, and apparatuses may, however, be embodied in many different forms and should not be construed as limited to any specific structure or function presented throughout this disclosure. Rather, these aspects are provided so that this disclosure will be thorough and complete, and will fully convey the scope of these methods, systems, and apparatuses to those skilled in the art. Based on the descriptions herein, one skilled in the art should appreciate that that the scope of the disclosure is intended to cover any aspect of the methods, systems, and apparatuses disclosed herein, whether implemented independently of or combined with any other aspect of the disclosure. For example, a system or apparatus may be implemented or a method may be practiced using any number of the aspects set forth herein. In addition, the scope of the disclosure is intended to cover such an apparatus, system, or method which is practiced using other structure, functionality, or structure and functionality in addition to or other than the various aspects of the disclosure set forth herein. It should be understood that any aspect of the disclosure herein may be embodied by one or more elements of a claim.

One skilled in the art should appreciate that an aspect disclosed herein may be implemented independently of any other aspects and that two or more of these aspects may be combined in various ways. For example, an apparatus may be implemented or a method may be practiced using any number of the aspects set forth herein. Similarly, methods disclosed herein may performed by one or more computer processors configured to execute instructions retrieved from a computer readable storage medium stored as code. A computer readable storage medium stores information, such as data or instructions, for some interval of time, such that the information can be read by a computer during that interval of time. Examples of computer readable storage media are memory, such as random access memory (RAM), and storage, such as hard drives, optical discs, flash memory, floppy disks, magnetic tape, paper tape, punch cards, and Zip drives.

In some aspects, a wireless communications system described herein may comprise a wireless area network. For example, the system may comprise a wireless local area network (WLAN) or a wireless personal area network (WPAN). A WLAN may be implemented according to one or more existing or developing standards, for example the Institute of Electrical Engineers (IEEE) 802.11 standard. The IEEE 802.11 standard denotes a set of WLAN air interface standards developed by the IEEE 802.11. For example, systems described herein may be implemented according to any one of the 802.11ad, 802.11ac, 802.11a, 802.11b, 802.11g, and 802.11n standards. Similarly, a WPAN may be implemented according to one or more of the IEEE standards, for example the IEEE 802.15 standard. The IEEE 802.15 standard denotes a set of WPAN air interface standards developed by the IEEE committee. For example, systems described herein may be implemented according to any one of the 802.11ad, 802.15.3b, 802.15.3c, 802.15.4a, 802.15.4b, and 802.15.4c standards. Such area networks may support Multiple Input/Multiple Output (MIMO) technology. In addition, the systems described herein may be implemented according to a Bluetooth standard.

Those of skill in the art will recognize that although the system described herein may be implemented according to one or more of the above standards, the system described herein is not limited to such implementations. In addition, those of skill in the art will recognize that while a system may be described as implementing one of these standards, devices present in the system may additionally or alternatively implement another standard. In this situation, it may be beneficial to account for devices that use such other standard in selecting the features of the system. For example, the system may not be configured to receive communications from the other devices, although it may be beneficial for the system to account for such communications from the other devices. In some aspects, the communications from the other devices may interfere with system messages unless select transmission and reception schemes are implemented.

In some aspects, for example in systems implemented according to the 802.11ad or 802.15.3c standards, the PHY layer may be used for millimeter wave (e.g., with carrier frequency of approximately 60 GHz) communications. For example, the system may be configured for millimeter wave communications in the 57 GHz-66 GHz spectrum (e.g., 57 GHz-64 GHz in the United States, and 59 GHz-66 GHz in Japan). Such implementations are particularly beneficial for use with short-range communications (e.g., several meters to tens of meters). For example, the system may be configured to operate within a conference room and to provide wireless communication capabilities between devices located within the conference room.

Systems utilizing a millimeter wave may have a central entity, such as an access point (AP)/point coordination function (PCF) that manages communications between different devices, also called stations (STAs). Having a central entity may simplify design of communication protocols. In some aspects, there may be a dedicated or predetermined AP. In other systems, a plurality of devices may perform functions of the AP. In some aspects, any device may used as an AP, or the performance of AP functionality may rotate between different devices. In some aspects, there may be a dedicated or predetermined AP, or a STA may be used to implement AP functionality, or there may be a dedicated or predetermined AP in combination with one or more STAs performing AP functionality.

An AP may comprise, be implemented as, or be referred to as a base station, a base transceiver station, a station, a terminal, a node, an access terminal acting as an access point, a WLAN device, a WPAN device, or some other suitable terminology. An access point (AP) may also comprise, be implemented as, or be referred to as a NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

A STA may comprise, be implemented as, or be referred to as an access terminal, a user terminal, a mobile station, a subscriber station, a station, a wireless device, a terminal, a node, or some other suitable terminology. An STA maybe also comprise, be implemented as, or be referred to as a remote station, a remote terminal, a user agent, a user device, user equipment, or some other terminology.

In some aspects, an STA may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

Although particular aspects are described herein, many variations and permutations of these aspects fall within the scope the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description, and drawings that will hereinafter be described, are merely illustrative of the disclosure rather than limiting.

FIG. 1 illustrates an aspect of a wireless communication system 100. As illustrated, the system 100 may include a number of wireless nodes 102 that can communicate with one another using wireless links 104, for example over a PHY layer using waves having a frequency of approximately 60 GHz, as described above. In the illustrated aspect, the wireless nodes 102 include four stations STA 1A-STA 1D and an access point AP 1E. Although the system 100 is illustrated with five wireless nodes 102, it should be appreciated that any number of nodes, wired or wireless, may form the wireless communication system 100.

Each of the nodes 102 in the system 100 may include, among other things, a wireless transceiver to support wireless communication and controller functionality to manage communication over the network. The controller functionality may be implemented within one or more digital processing devices. The wireless transceiver may be coupled to one or more antennas to facilitate the transmission and reception of signals over a wireless channel. Any type of antennas may be used including, for example, dipoles, patches, helical antennas, antenna arrays, and/or others.

As illustrated, the AP 1E may transmit a beacon signal 110 (or simply a "beacon") to other nodes of the system 100, which may help the other nodes STA 1A-STA 1D to synchronize their timing with the AP 1E, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In the system 100, the STAs 1A-1D may be distributed throughout a geographic region in such a manner that each STA 1A-1D may not be able to communicate with every other STA 1A-1D. Further, each STA 1A-1D may have a different coverage region over which it may communicate. In some aspects, a peer-to-peer network may be established between two or more of the STAs 1A-1D.

In some aspects, an STA may be required to associate with the AP in order to send communications to and/or receive communications from the AP. In one aspect, information for associating is included in a beacon broadcast by the AP. To receive such beacon, the STA may perform a broad coverage search over a coverage region, for example. A search may also be performed by the STA by sweeping a coverage region in a lighthouse fashion, for example. After receiving the information for associating, the STA may transmit a reference signal, such as an association probe or request, to the AP. In some aspects, the AP may use backhaul services, for example, to communicate with a larger network, such as the Internet or a public switched telephone network (PSTN).

Figure 2:
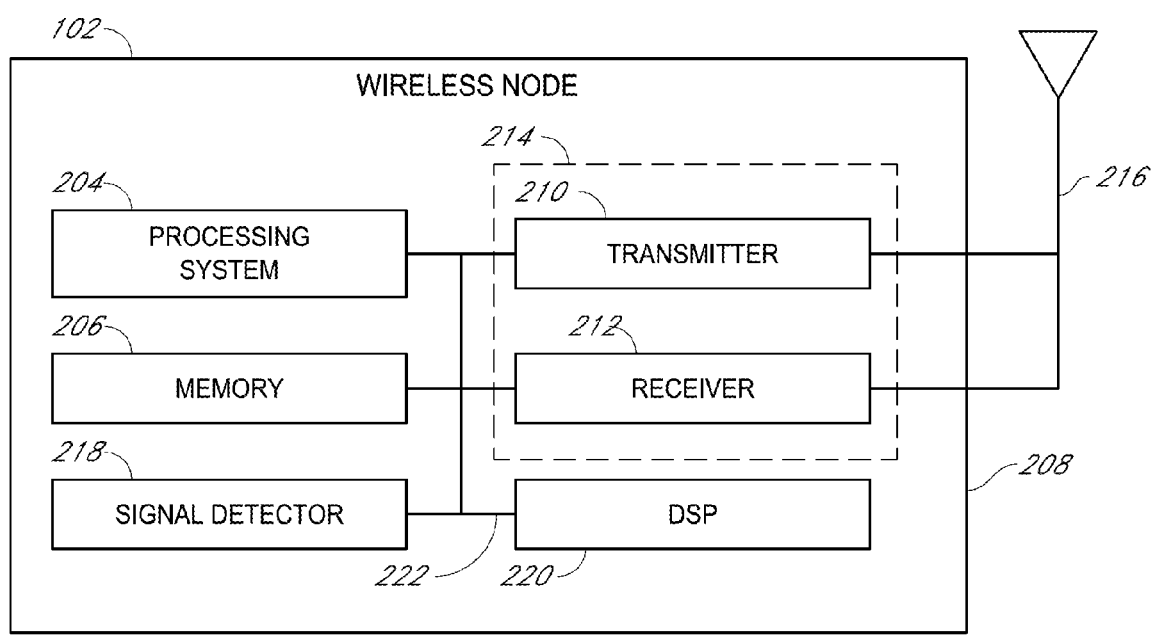
FIG. 2 is illustrates an aspect of a wireless node for use in the communication system illustrated in FIG. 1.

FIG. 2 illustrates an aspect of the wireless node 102 that may be employed within the wireless communication system 100. For example, one or more of the STAs 1A-1D or the AP 1E may be implemented as described with respect to FIG. 2. The wireless node 102 is an aspect of a device that may be configured to implement various methods described herein. The wireless node 102 may be enclosed within a housing 208, or the components of the wireless node 102 may be otherwise supported or grouped together by another structure. In some aspects, the housing 208 or other structure is omitted.

The wireless node 102 may include a processing system 204 which controls operation of the wireless node 102. The processing system 204 may in some aspects be referred to as a central processing unit (CPU). In some aspects, the processing system 204 may comprise or be implemented with a circuit configured to perform at least the functions of the processing system 204. Memory 206, which may include both read-only memory (ROM) and random access memory (RAM) and may be volatile or permanent, may provide instructions and data to the processing system 204. A portion of the memory 206 may also include non-volatile random access memory (NVRAM). The processing system 204 typically performs logical and arithmetic operations based on program instructions stored within the memory 206, but may of course perform other operations. The instructions in the memory 206 may be executable to implement the methods described herein. Additionally, the node 102 may be configured to accept another type of computer readable medium, such as a disk or form of memory card, or may be connected to a computer readable medium, such as a hard drive, which may comprise instructions that when executed cause the node 102 to execute a method or process described herein.

The wireless node 102 may also include a transmitter 210 and a receiver 212 to allow transmission and reception of communications between the wireless node 102 and a remote location. Those of skill in the art will recognize that the transmitter 210 and receiver 212 may be combined into a transceiver 214. An antenna 216 may be attached to the housing 208 and electrically coupled to the transceiver 214. The wireless node 102 may also include (not shown) multiple transmitters, multiple receivers, multiple transceivers, and/or multiple antennas.

Multiple antennas at the wireless node 102 may be used to communicate to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal. In addition, multiple antennas may enable increased ability to implement beamforming or a plurality of communication beam patterns. In some aspects, one or more antennas are steerable.

The wireless node 102 may also include a signal detector 218 that may be used in an effort to detect and quantify the level of signals received by the transceiver 214. The signal detector 218 may detect such signals as total energy, energy per subcarrier per symbol, power spectral density, and other signals. The wireless node 102 may also include a digital signal processor (DSP) 220 for use in processing signals. Of course, the DSP 220 may be omitted in some aspects, or the functions of the DSP may be performed by the processing system 204.

The various components of the wireless node 102 may be coupled together by a bus system 222, which may include a power bus, a control signal bus, and a status signal bus in addition to a data bus. Of course, the components may be coupled or electrically connected in other ways or using other means as well.

As described above, either an STA, an AP, or both may be implemented according the description of the wireless node 102 above. In some aspects, any device capable of transmitting a beacon signal may serve as an AP. In some aspects, however, in order for an AP to be effective it may have to have a good link quality to all STAs in a network. At high frequencies, where signal attenuation may be relatively severe, communications may be directional in nature and may use beamforming (e.g. beam training) to increase gains. As such, an effective AP may beneficially have a large sector bound (e.g. a wide steering capability). The AP may have a large beamforming gain (which may be provided, for example, by multiple antennas), may be mounted so that a line of sight path exists to most areas served by the wireless system 100, and/or may use a steady power supply for periodic beacon transmissions and other management functions. Even if a device has an antenna steering capability that may be limited to a small sector bound, an available power that may be limited, and/or a location that may be variable, however, the device may in some aspects perform as an AP, for example when forming peer-to-peer networks. Peer-to-peer networks may be used for a variety of purposes, such as side-loading, file sharing, and other purposes. In some aspects, a peer-to-peer network may be created where no device may efficiently transmit to and receive from all other devices.

In some aspects, the wireless node 102 is equipped with multi-mode radios with different frequency transceivers, for example a 60 GHz transceiver, a 2.4 GHz transceiver, a 5 GHz transceiver, etc. In some implementations, lower frequency communications may be performed omni-directionally and higher frequency communications may be performed directionally. Such aspects may be advantageous in a network to where an omni-directional protocol may be used to locate and set up further communications and where the further communications use a directional protocol.

FIGS. 3A-3D illustrates aspects of beamforming. As described above, the wireless node 102 may be configured to implement one or more types of beamforming, for example using the antenna 216 or a plurality of antennas. Although the beamforming will be described below with respect to an AP, those of skill in the art will appreciate that an STA as described above may implement such beamforming. Those of skill in the art will additionally appreciate that the beamforming described below may refer to signals being transmitted, as well as to a beam or direction in which signals are received. Further, those of skill in the art will appreciate that an AP may implement different beamforming for receiving as for transmitting, and/or may dynamically adjust any such beamforming. The beamforming may also be predetermined.

Figure 3A:
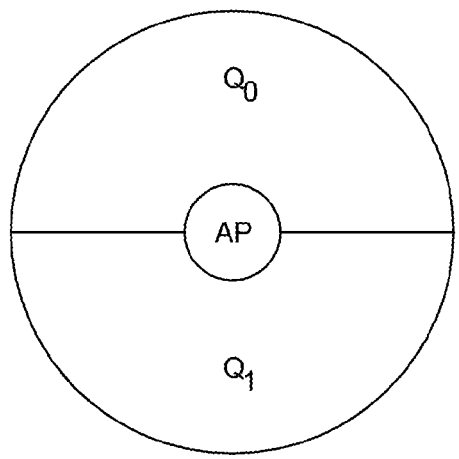
FIGS. 3A-3D illustrate aspects of beamforming for use in the communication system illustrated in FIG. 1.

The term quasi-omni pattern generally relates to the lowest resolution pattern that covers a very broad area of a region of space of interest around a device. An AP, for example as illustrated by AP 1E in FIG. 1 or as implemented as illustrated in FIG. 2, may cover the region of space of interest in a minimal set of, possibly overlapping, quasi-omni patterns. A set size equal to one may indicate that the AP is able to cover the spatial region of interest with only one quasi-omni pattern, indicating that the AP is omni-capable. The quasi-omni transmit and receive patterns may be identified by $Q_n$, where n represents a respective direction. Those of skill in the art will appreciate that the beams may be overlapping, and that each direction denoted by a separate n need not be distinct. A beam pattern having two approximately equal patterns is illustrated in FIG. 3A. In this aspect, n=2.

Of course, beams having a narrower azimuth than described with respect to the quasi-omni pattern may be used. Such narrower beams may be advantageous because each beam may be characterized by a greater gain and increased signal to noise ratio (SNR) as compared to the beams used in the quasi-omni pattern. This is particularly advantageous in systems which experience high signal fading or decay.

Figure 3B:
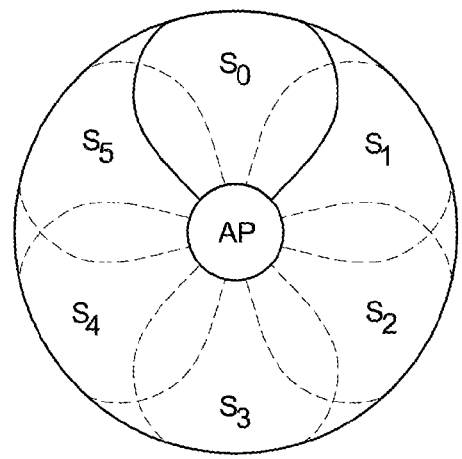

FIG. 3B illustrates an aspect of beamforming where the azimuth is narrower than described with respect to the quasi-omni pattern. The transmit and receive patterns are identified by $S_0$-$S_5$. As can be seen in FIG. 3B, the beams formed by the AP may overlap. Of course, the beam pattern may comprise beams which do not overlap. As described above, the AP may be configured to change a direction in which the beam is pointing. Thus, the AP in FIG. 3B may first send and/or receive communications via beam $S_1$, then via beam $S_2$, etc. The AP can, but need not, change directions so as to point the beam in successive directions to form a complete circle (i.e. pointing in directions 0-5 in order, then starting again at 0). The AP may instead change directions in any order, or may randomly select a direction in which to point.

Figure 3C:
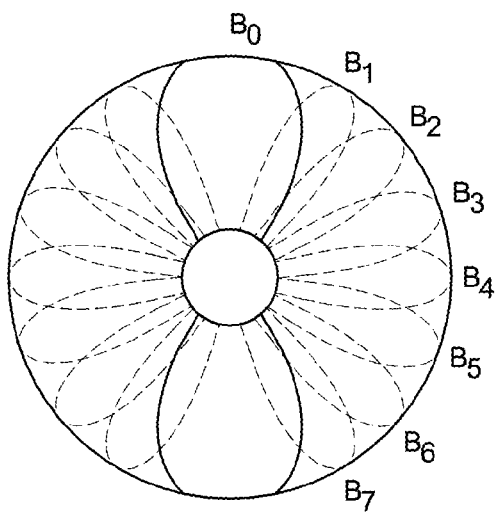
Figure 3D:
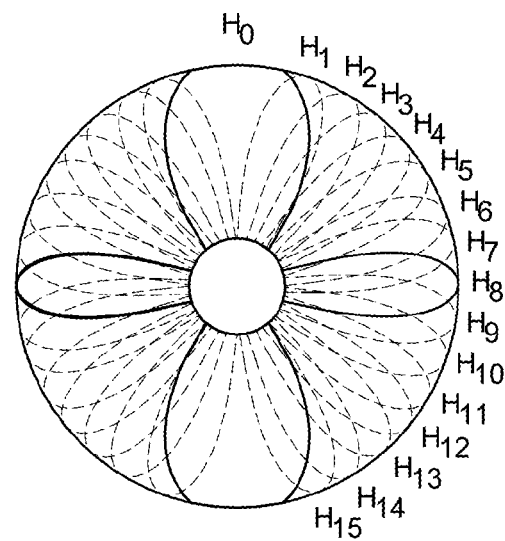

FIGS. 3C and 3D illustrate aspects having even narrower beams. FIG. 3C shows a beam pattern having 16 directions $B_0$-$B_{15}$ (only half of these directions, $B_0$-$B_7$, are numbered in the illustration), and FIG. 3D shows a beam pattern having 32 directions $H_0$-$H_{31}$ (only half of these directions, $H_0$-$H_{15}$, are numbered in the illustration). Narrower beams may provide the advantages discussed above, but may also require additional overhead information, or may require additional time for changing the direction of the beam. Thus, when selecting a number of beams to use, the requisite overhead may need to be considered. Although the beams are illustrated as being substantially symmetric, the beam shapes, sizes, and/or distribution may vary.

The term sector may generally be used to refer to a second level resolution pattern that covers a relatively broad area of multiple beams. A sector can cover a set of consecutive and nonconsecutive beams and different sectors can overlap. Beams can be further divided into high-resolution (HRS) beams as a high level of resolution pattern.

The multi-resolution definition of quasi-omni patterns, sectors, beams and HRS beams may become a multi-level definition, where each level may use a set of antenna patterns. Therefore, quasi-omni patterns may represent a first set of antenna patterns, sectors may represent a second set of antenna patterns, beams may represent a third set of antenna patterns preferably derived from the second set of antenna patterns, and HRS beams may represent a fourth level of antenna patterns preferably derived from the third set of antenna patterns.

Figure 4:
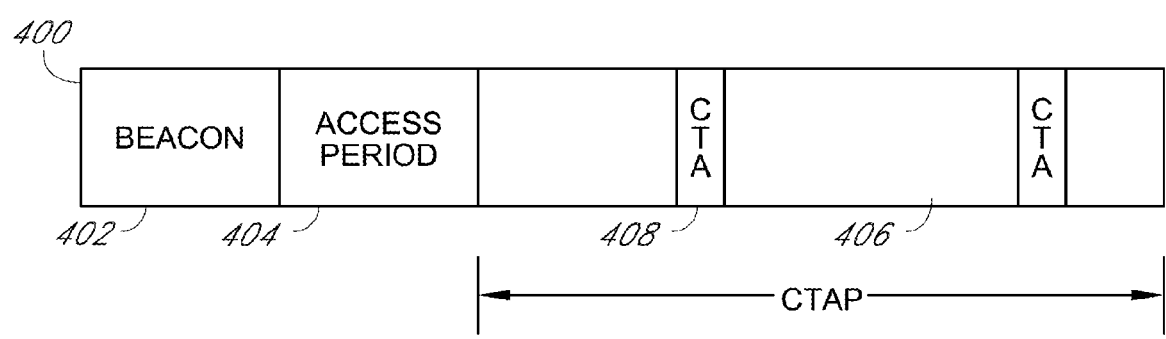
FIG. 4 illustrates an aspect of a superframe structure.

FIG. 4 illustrates an aspect of a superframe structure, as previously described above. The superframe 400 may comprise a beacon interval 402, an access period 404, and a channel time allocation period (CTAP) 406. The CTAP 406 may comprise multiple channel time allocations (CTAs) 408.

In one aspect of a communication network, none of the devices serves as a central coordinating entity. For example, in an ad-hoc peer-to-peer network, it is possible that none of the devices are capable of serving as a coordinator. As another example, in a distributed network, it is possible that it is undesirable to designate a single device as the coordinator. Without a single coordinator, a network may be more robust to outages or DoS (denial of service) attacks. Further, network topology may be such that no single device is capable of transmitting a beacon which would reach all devices of the network and/or all prospective devices wishing to join the network. For example, at high frequencies, large path loss and the severity of attenuation from blockage and reflection may prohibit any single device from transmitting to all devices or even a majority of the devices. In another aspect, the use of a coordinator may use more power than a distributed network, or there may be no device with enough power to transmit beacons to each device.

As described above, beacons are used by devices within the network and prospective devices wishing to join the network for a number of different purposes. Beacons may be used for synchronization, communication of network information, or network advertisement and discovery. Generally, beacons are data packets which may contain predetermined sequences, network information, or control information.

In one aspect of a communication network, multiple devices transmit beacons. For example, 802.11 describes a distributed approached called IBSS mode (Independent Basic Service Set) which is based on CSMA/CA (collision sense multiple access with collision avoidance). This approach may not be effective for the transmission of beacons in multiple directions.

Figure 5:
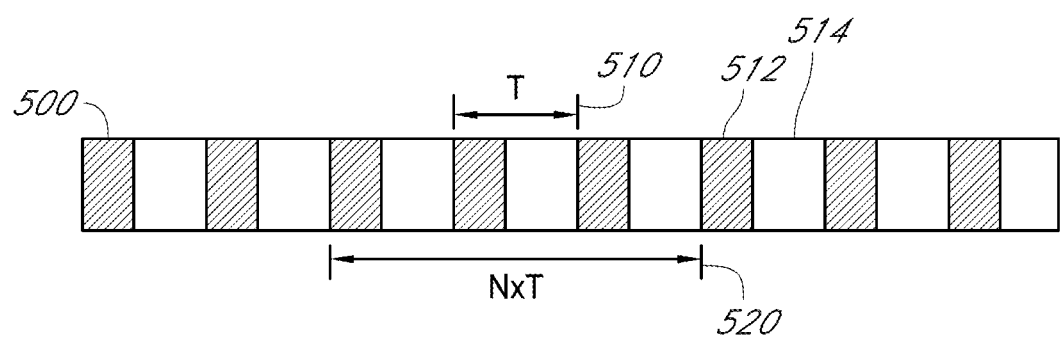
FIG. 5 is a timeline illustrating a partitioning into a plurality of superframes.

A communication network may be synchronized such that time is partitioned into a plurality of superframes. FIG. 5 illustrates time 500 partitioned into superframes. A particular superframe 510 of duration T comprises a beacon transmission period 512 and a non-beacon transmission period 514. During the beacon transmission period 512, one or more devices may transmit one or more beacons. Although the term "beacon transmission period" is used, it is to be appreciated that transmission may not occur, but rather that the period of time is allocated for the transmission of beacons in the network. The superframe 510 also includes a non-beacon transmission period 514 during which beacons are not transmitted. Although the term "non-beacon transmission period" is used, it is to be appreciated that transmission may not occur, but rather that the period of time is allocated for a use other than the transmission of beacons. Time 500 is partitioned into a number of beacon transmission periods 512, or beacon intervals, separated by non-beacon transmission periods 514. A non-beacon transmission period may include period for contention-based communication, a period for non-contention based communication, or both. During the non-beacon transmission period, control information, channel requests, and/or content may be transmitted.

During a beacon transmission period 512, beacons may be transmitted in different directions by a single device using different transmit beam patterns. A number of successive superframes may be identified as a supergroup. A supergroup 520 of N superframes having a duration of N*T is illustrated in FIG. 5. The beacon transmission periods 512 within a supergroup 520 may be referred to as successive beacon transmission periods even though they are not consecutive, in that they are separated by non-beacon transmission periods.

Figure 6:
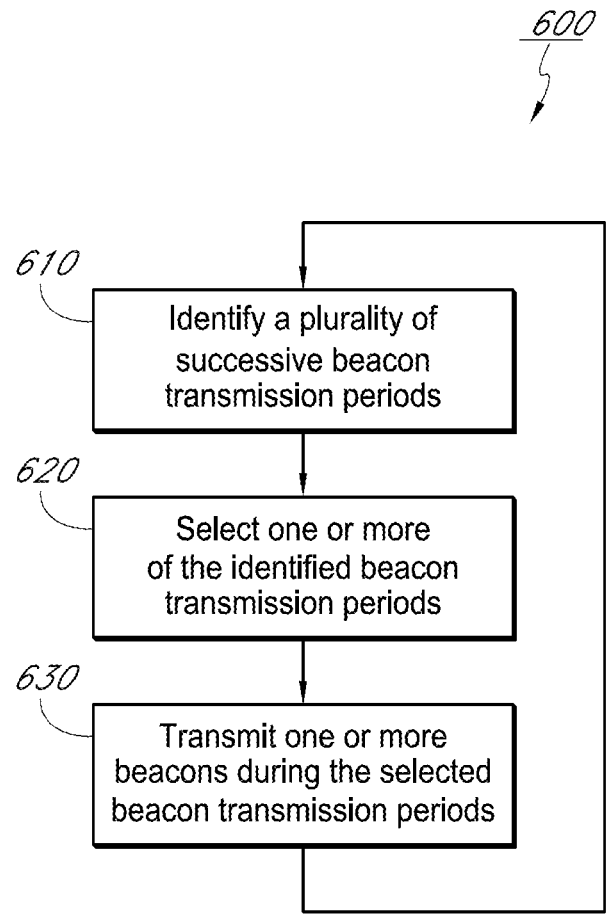
FIG. 6 is a flowchart illustrating a method of communication with beacon transmission.

Many of the method described below are specific aspects of a more general method of communication. FIG. 6 is a flowchart illustrating a method 600 of communication with beacon transmission.

The method 600 begins, in block 610, with the identification of a plurality of successive beacon transmission periods. The identification may be performed, for example, by at least one of the processing system 204 or memory 206 of FIG. 2. As mentioned above, successive beacon transmission periods may not be consecutive, but rather, separated by non-beacon transmission periods. In one aspect, the successive beacon transmission periods are identified by identifying a supergroup to which the beacon transmission periods belong. In one aspect, the successive beacon transmission periods are identified based on a received message. In one aspect, the successive beacon transmission periods are identified based on a message received from an S-AP (Service Access Point). In a particular, aspect, the identified beacon transmission periods are future beacon transmission periods which have not occurred. The number of identified beacon transmission periods, N, can be any number two or greater. In one aspect, N is selected based on the number of devices known to be in the network, K. In one aspect, N is randomly selected. In one aspect, N is defined, at least in part, by a communication standard encoded into the device. In one aspect, N is dynamic and may change during different uses of the method 600.

Next, in block 620, one or more of the beacon transmission periods are selected. The selection may be performed, for example, by the processing system 204 of FIG. 2. The number of selected periods, S, may be based on the number of devices known to be in the network, K, the number of identified beacon transmission periods, N, capabilities of the device, conditions of the device, power constraints, a number of beam directions associated with the device, number of devices within communication range of the device, and/or the order in which the device joined the network. In a particular aspect, S is less than N. The number of selected periods, S, can range from one to N, and may be different during different uses of the method 600.

As will be described further below, the selection can be random or deterministic. In each case, the selection may be based, at least in part, on information received from other devices, a schedule, carrier sensing, when other devices are scheduled to transmit, a received list of neighboring devices, or other information.

Once the beacon transmission periods are selected in block 620, the method 600 continues to block 630, where one or more beacons are transmitted during the selected periods. The transmission may be performed, for example, by the transceiver 214 of FIG. 2. In one aspect, during each of the selected periods, a beacon is transmitted by the device in each beam direction of the device. In another aspect, during each of the selected periods, a beacon is transmitted in only one beam direction of the device. In one aspect, the number of selected periods is equal to the number of beam directions of the device, and during each of the selected periods, the device transmits a beacon in a different direction. In one aspect, the beacon transmits, during each selected period, in more than one beam direction, but less than all of the beam directions of the device.

The method 600 may repeat by returning to block 610 or end. In one aspect, the identification performed in block 610 is performed before the selection and transmission in blocks 620 and 630. Particularly, beacon transmission periods are identified which have not yet occurred. In one aspect, identification in block 610 is performed for a second use of the method 600 before transmission 630 in a first use of the method 600.

Figure 7:
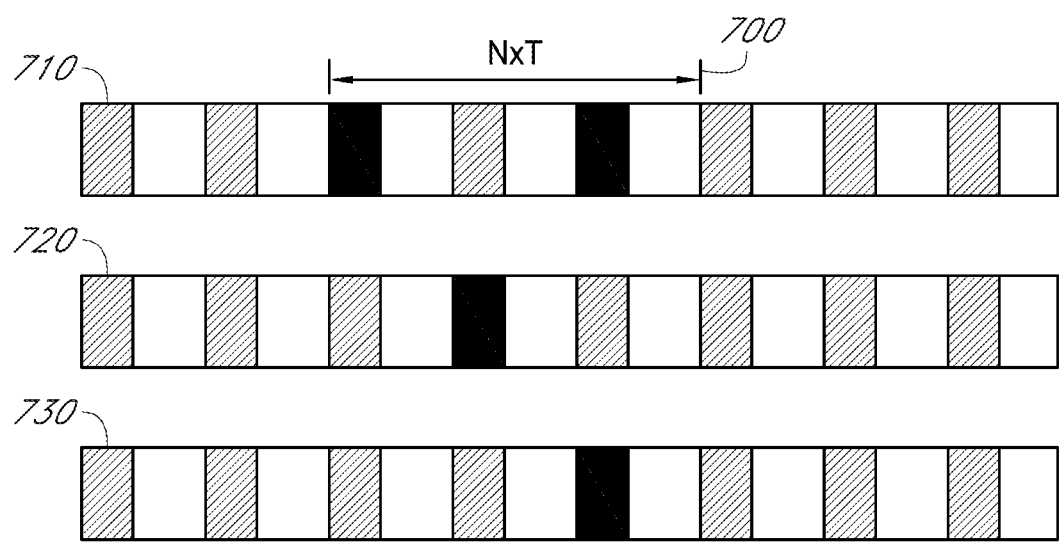
FIG. 7 is a set of timelines for three devices randomly transmitting beacons.

An example result of the use of the method 600 of FIG. 6 is shown in FIG. 7 in which the selection of block 620 is performed randomly. FIG. 7 is a set of timelines for three devices randomly transmitting beacons. The timeline for the first device 710 illustrates that, during an identified supergroup 700, the first device transmits one or more beacons during the first and third of three successive beacon periods. The timeline for the second device 720 illustrates that, during the supergroup 700, the second device transmits one or more beacons during the second beacon period. The timeline for the third device 730 illustrates that, during the supergroup 700, the third device transmits one or more beacons during the third beacon period.

Because more than one device may select the same beacon interval, some beacons may collide at certain devices. For example, in FIG. 7, it is possible, depending on the beam directions in which beacons are transmitted, that a collision may occur during the third of the three identified successive beacon periods. Accordingly, the number of identified beacons, N, and the number of selected beacons, K, may be selected to avoid such collisions. Although FIG. 7 illustrates an aspect in which a beacon is transmitted by at least one of devices during each beacon transmission period, in other aspects, there may be beacon transmission periods in which no device transmits a beacon.

Figure 8:
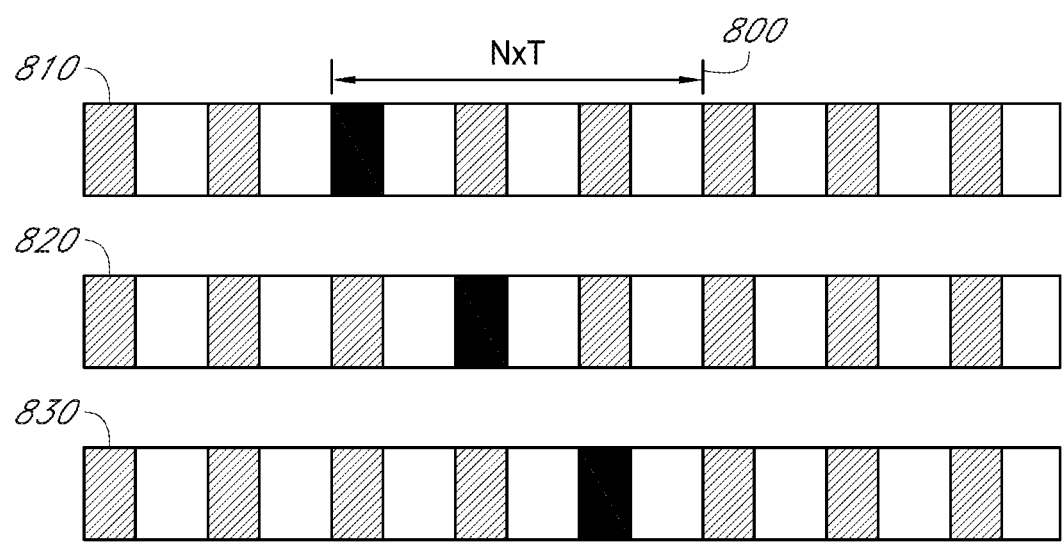
FIG. 8 is a set of timelines for three devices transmitting beacons according to a schedule.

As illustrated by FIG. 7, in one aspect beacon transmissions are random. In another aspect, beacon transmissions are deterministic. FIG. 8 is a set of timelines for three devices transmitting beacons according to a schedule. In particular, an example result of the use of the method 600 of FIG. 6 is shown in FIG. 8 in which the selection of block 620 is performed accordingly to a schedule.

In one aspect, the schedule is determined and/or updated by a single device. The schedule may be transmitted to the other devices by the schedule determining device directly, or transmitted through the network via other devices. In another aspect, the schedule is determined locally by each device according to a common policy. Such a policy may be based on the number of devices known to be in the network, K, the number of identified beacon transmission periods, N, capabilities of the device, conditions of the device, power constraints, a number of beam directions associated with the device, a device identifier and/or the order in which the device joined the network. Tie-breaking algorithms may be used in determining the schedule.

In one aspect, the schedule is maintained through the use of scheduling messages. In one aspect, if a device wishes to begin transmitting beacons, it transmits a scheduling message to one or more of the other devices, such as a designated schedule determining device, informing the other devices of its desire to transmit beacons. In one aspect, the scheduling message is distributed through the network to other devices not within the range of the device. The device may begin transmitting beacons after a defined number of superframes, or may await an acknowledgment message before transmitting beacons. In some cases, the device may receive a denial message indicating that the device should not begin transmitting beacons.

In one aspect, if a device wishes to cease transmitting beacons, it may transmit a scheduling message to one or more of the devices, such as a designated schedule determining device, informing the other devices of its desire to cease transmission of beacons. In another aspect, if a device does not transmit beacons for a defined time or if the device does not transmit one or more beacons according to the defined schedule, the schedule may be updated to reflect the lack of transmission.

The timeline for the first device 810 illustrates that, during an identified supergroup 800, the first device transmits one or more beacons during the first of three successive beacon periods. The timeline for the second device 820 illustrates that, during the supergroup 800, the second device transmits one or more beacons during the second beacon period. The timeline for the third device 830 illustrates that, during the supergroup 800, the third device transmits one or more beacons during the third beacon period.

Each of the devices in the network may store a list of neighboring devices. The list may be stored, for example, in the memory 206 of FIG. 2. The list of neighboring devices may be used in determining a schedule. In one aspect, the list of neighboring devices is a list of device identifiers. In one aspect, a first device will be included on the list of neighboring devices of a second device if the second device has recently received a beacon from the first device. For example, a first device may be included on the list if the second device has received a beacon from the first device within a defined amount of time. A first device may be added to the list of neighboring devices of a second device upon the second device's reception of a beacon from the first device. Similarly, a first device may be removed from the list of neighboring devices of a second device if a beacon has not been received from the first device after a defined period.

In one aspect, the list of neighboring devices of a device, or data indicative of the list, is included in the beacon transmitted by the device. Thus, by analyzing a beacon received from a first device, a second device is able to determine if the first device is receiving beacons transmitted by the second device. Accordingly, receiving a list of neighbors, or a beacon including data indicative of the list of neighbors, from a device is receiving data regarding reception of a beacon by the device. If the second device determines that its beacons are not being received by the first device, it may initiate one or more actions based on the determination. In one aspect, the second device alters its selection of beacon transmission periods during which to transmit beacons based on the determination that the first device is not receiving beacons from the second device. In one aspect, the second device changes the number of beacons selected, S. In one aspect, the second device increases its beacon transmit power based on the determination that the first device is not receiving beacons from the second device.

Efficient scheduling may effectively reduce or prevent collisions. However, the determination and updating of the schedule may be computationally intensive, use additional memory, and/or draw excess power. Further, the transmission of scheduling messages and/or a list of neighbors may introduce additional overhead. These issues may be particularly severe when beam directions via which beacons are transmitted for each selected period are determined according to a schedule. The scheduling algorithm may reflect this trade-off between reduction of collisions and additional overhead, computationally intensity, memory usage, and power usage.

Figure 9:
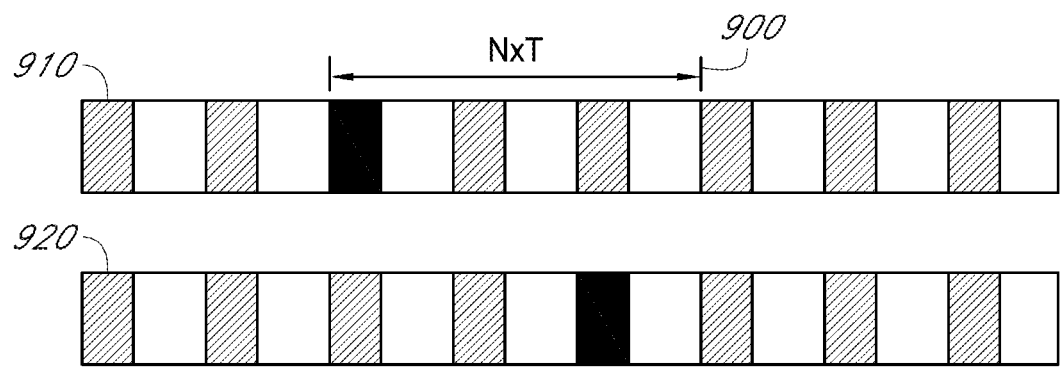
FIG. 9 is a set of timelines for two devices transmitting beacons based on carrier sensing.

In another aspect, beacon transmissions are based on carrier sensing. FIG. 9 is a set of timelines for two devices transmitting beacons based on carrier sensing. In particular, an example result of the use of the method 600 of FIG. 6 is shown in FIG. 9 in which the selection of block 620 is performed based on carrier sensing.

In order to select one or more of the identified beacon transmission periods, in block 620 of FIG. 6, a channel is sensed to determine if a beacon is being transmitted on the channel. The sensing may be performed, for example, by at least one of the processing system 204 or transceiver 214 of FIG. 2. In one aspect, the channel is sensed for a predetermined amount of time. In one aspect, the predetermined amount of time is a beacon transmission period. In another aspect, the predetermined amount of time is more than one beacon transmission period. In one aspect, the sensing includes sensing in one or more beam directions. In another aspect, the predetermined amount of time is less than a beacon transmission period and transmission occurs within the same beacon transmission period as the sensing. Next, it is determined whether or not a beacon is being transmitted on the channel. The determination may be performed, for example, by the processing system 204 of FIG. 2. In one aspect, it is determined that a beacon is being transmitted if a beacon is received during a predetermined amount of time. In one aspect, it is determined that a beacon is being transmitted if a measured energy level is above a defined threshold.

If it is determined that a beacon is being transmitted on the channel, no beacon transmission period is selected. If it is not determined that a beacon is being transmitted on the channel, beacon transmission periods are selected. The selection may be performed, for example, by the processing system 204 of FIG. 2. In one aspect, the beacon transmission periods are randomly selected from the remaining beacon transmission periods after sensing for one or more beacon transmission periods. In one aspect, the beacons transmission periods are randomly selected, not from all of the remaining beacon transmission periods after sensing for one or more beacon transmission periods, but only those after a defined back-off number of beacon transmission periods occurring successively after the sensing are excluded.

The timeline for the first device 910 illustrates that, during an identified supergroup 900, the first device transmits one or more beacons during the first of three successive beacon periods.

If the second device desires to transmit beacons, it senses the channel during the first beacon transmission period and determines that a beacon is being transmitted. Thus, it does not transmit a beacon during the first beacon transmission period and senses the channel during the next beacon transmission period. During the second beacon transmission period, the second device determines that a beacon is not being transmitted and selects the third beacon transmission period for transmission. The timeline for the second device 920 illustrates that, during an identified supergroup 900, the second device transmits one or more beacons during the third of three successive beacon periods.

Figure 10:
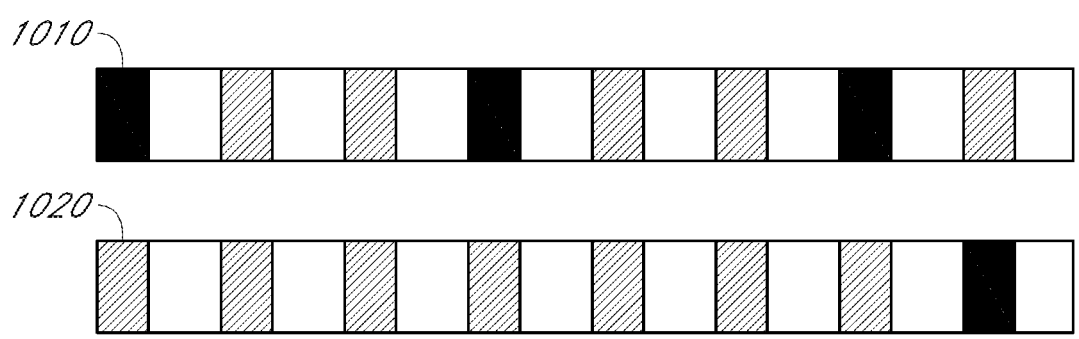
FIG. 10 is another set of timelines for two devices transmitting beacons based on carrier sensing.

Another example result of beacon transmission based on carrier sensing is shown in FIG. 10. FIG. 10 is another set of timelines for two devices transmitting beacons based on carrier sensing. The timeline for the first device 1010 illustrates that the first device transmits one or more beacons during the first of every three successive beacon periods. As illustrated, the first device transmits one or more beacons during the first, fourth, and seventh beacon transmission period.

If the second device desires to transmit beacons, it senses the channel during the first six beacon transmission period and determines that a beacon is being transmitted every third beacon transmission period and is not being transmitted in between those transmissions. The second device may select one or more beacon transmission periods based on a pattern, such as a periodic pattern, determined by sensing the channel. The timeline for the second device 1020 illustrates that the second device transmits one or more beacons during the eighth beacon transmission period. In one aspect, the second device transmits one or more beacons every third beacon transmission period following the eighth beacon transmission period, i.e., the eleventh beacon transmission period, fourteenth beacon transmission period, etc.

Figure 11:
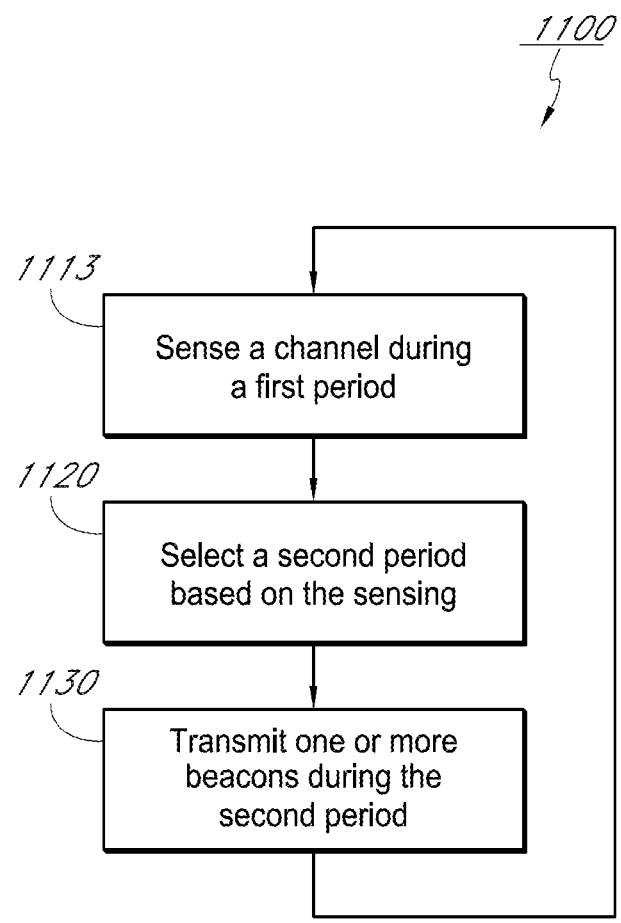
FIG. 11 is a flowchart illustrating a method of communication with beacon transmission based on carrier sensing.

There are other methods of communication based on carrier sensing. FIG. 11 is a flowchart illustrating a method 1100 of communication with beacon transmission. The method 1100 begins, in block 1113, in which a channel is sensed for a first period comprising at least a first portion of a beacon transmission period to determine if a beacon is being transmitted on the channel. The sensing may be performed, for example, by at least one of the processing system 204 or transceiver 214 of FIG. 2.

In one aspect, the channel is sensed for less than a determined beacon period. In one aspect, the channel is sensed for a single beacon transmission period. In another aspect, the channel is sensed for more than one beacon transmission period. In one aspect, the sensing of block 1413 includes sensing in one or more beam directions.

Next, in block 1420, a second period is selected based on the sensing. The second period includes at least a second portion of a beacon transmission period. The selection may be performed, for example, by the processing system 204 of FIG. 2. For example, if a beacon is sensed during the first period, a different second period may be selected than would be selected if a beacon is not sensed during the first period. As another example, as illustrated in FIG. 10, a pattern or periodicity of beacon transmission may be determined based on the sensing and the second period may be selected based on the determined pattern or periodicity.

In one aspect, the first period and the second period are two portions of the same defined beacon transmission period. In another aspect, the first period is at least a portion of a first beacon transmission period and the second period is at least a portion of a second beacon transmission period subsequent to a non-beacon transmission period which is subsequent to the first beacon transmission period. Thus, in one aspect the first period and second period are portions of different defined beacon transmission periods.

Once the second beacon transmission period (or periods) is selected in block 1420, the method 1400 continues to block 1430, where one or more beacons are transmitted during the second period. The transmission may be performed, for example, by the transceiver 214 of FIG. 2. In one aspect, during the second period, a beacon is transmitted by the device in each beam direction of the device. In another aspect, during the second period, a beacon is transmitted in only one beam direction of the device.

The method 1400 may repeat by returning to block 1413 or end. In one aspect, the sensing performed in block 1413 is performed before the selection and transmission in blocks 1420 and 1430. In one aspect, sensing in block 1413 is performed for a second use of the method 1400 before transmission 1430 in a first use of the method 1400.

Figure 12:
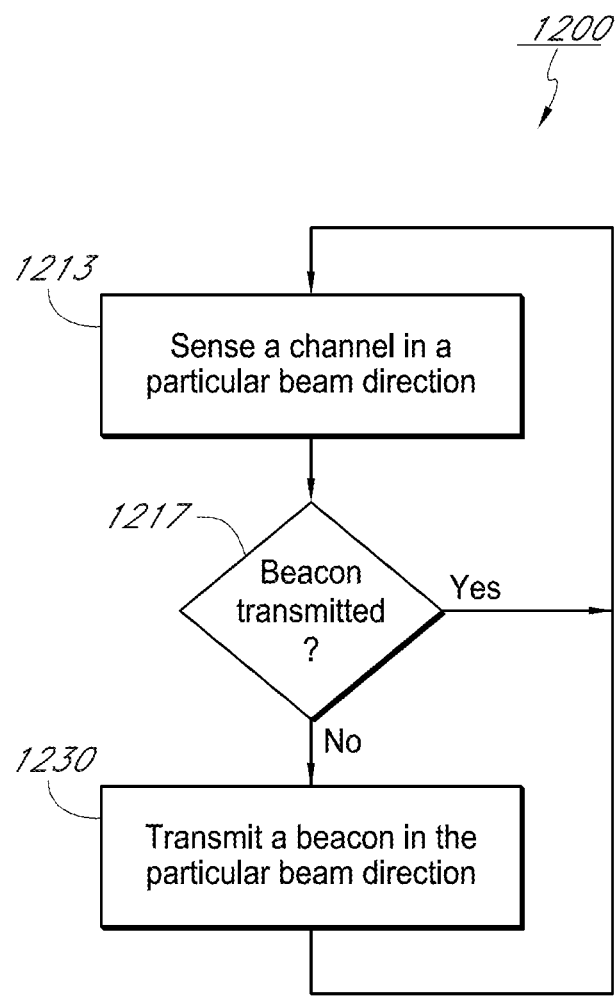
FIG. 12 is a flowchart illustrating a method of communication in which beacon transmission times are selected based on carrier sensing in different directions.

In one aspect, in order to determine when to transmit beacons, a device may use a method of communication described with respect to FIG. 12. FIG. 12 is a flowchart illustrating a method 1200 of communication in which beacon transmission times are selected based on carrier sensing in different directions. The method 1200 begins, in block 1213, in which a channel is sensed in a particular beam direction to determine if a beacon is being transmitted on the channel. The sensing may be performed, for example, by one or more of the processing system 204 or transceiver 214 of FIG. 2. In one aspect, the channel is sensed for a defined amount of time. In one aspect, the defined amount of time is a first portion of a beacon transmission period. In one aspect, multiple uses of the method 1200 constitute a first portion of a beacon transmission period.

Next, in block 1217, it is determined whether or not a beacon is being transmitted on the channel in the particular beam direction. The determination may be performed, for example, by the processing system 204 of FIG. 2. In one aspect, it is determined that a beacon is being transmitted if a beacon is received during a predetermined amount of time. In one aspect, it is determined that a beacon is being transmitted if a measured energy level is above a defined threshold.

If it is determined, in block 1217, that a beacon is being transmitted on the channel in a particular direction, the method 1200 returns to block 1213. If it is not determined, in block 1217, that a beacon is being transmitted on the channel, the method 1200 continues to block 1230 in which a beacon is transmitted in the particular direction. The transmission may be performed, for example, by the transceiver 214 of FIG. 2. In one aspect, the beacon is transmitted during a second portion of a beacon transmission period. The transmission time during the second portion of the beacon transmission period can be randomly determined. In one aspect, the transmission time during the second portion of the beacon transmission period is determined after a defined back-off time.

The method 1200 may repeat by returning to block 1213 or end. In one aspect, the method 1200 is repeated for multiple beam directions during a single beacon transmission period. In one aspect, the channel is sensed in multiple directions prior to transmission in multiple directions. In another aspect, sensing of the channel in multiple directions and transmission in multiple directions are interleaved.

In many cases, when a device receives two or more data packets simultaneously (or substantially overlapping in time) containing different data from different sources over the same channel, the device cannot extract the data from any of the packets. However, this is not always the case when a device simultaneously (or substantially overlapping in time) receives two or more data packets containing the same data over the same channel, either from different sources or via different paths from a single source.

If two or more data packets containing the same data are received simultaneously over a channel, the data packets are inherently combined. If two or more data packets containing the same data are received over a channel at non-overlapping different times, windowing is sufficient to separate the packets, which may be added together. If two or more data packets containing the same data are received over a channel overlapping in time, there are a number of methods of combining the packets. Such methods include equalization, diversity combining, rake reception, and other multipath mitigation techniques.

In one aspect, beacons transmitted from different devices in a network will be at least partially the same. A device receiving beacons from two or more transmitters, even if overlapping, can combine them to extract at least some of the beacon contents. In one aspect, beacons transmitted in the network include a preamble which may be the same for two or more beacons. In one aspect, beacons transmitted in the network include a synchronization sequence which may be the same for two or more beacons. In one aspect, beacons transmitted in the network include Golay, Walsh, pseudonoise (PN), or other spreading codes which may be the same for two or more beacons. In one aspect, beacons transmitted in the network include payload information which may be the same for two or more of the beacons.

In one aspect, beacons transmitted from different devices in a network will be at least partially different. For example, a time-stamp, a list of neighbors, or a device ID may differ depending on the transmitting device. In one aspect, this information is spread using a Golay, Walsh, PN, or other spreading code so that, in the event of collision, the data can still be extracted by the receiving device.

Figure 13:
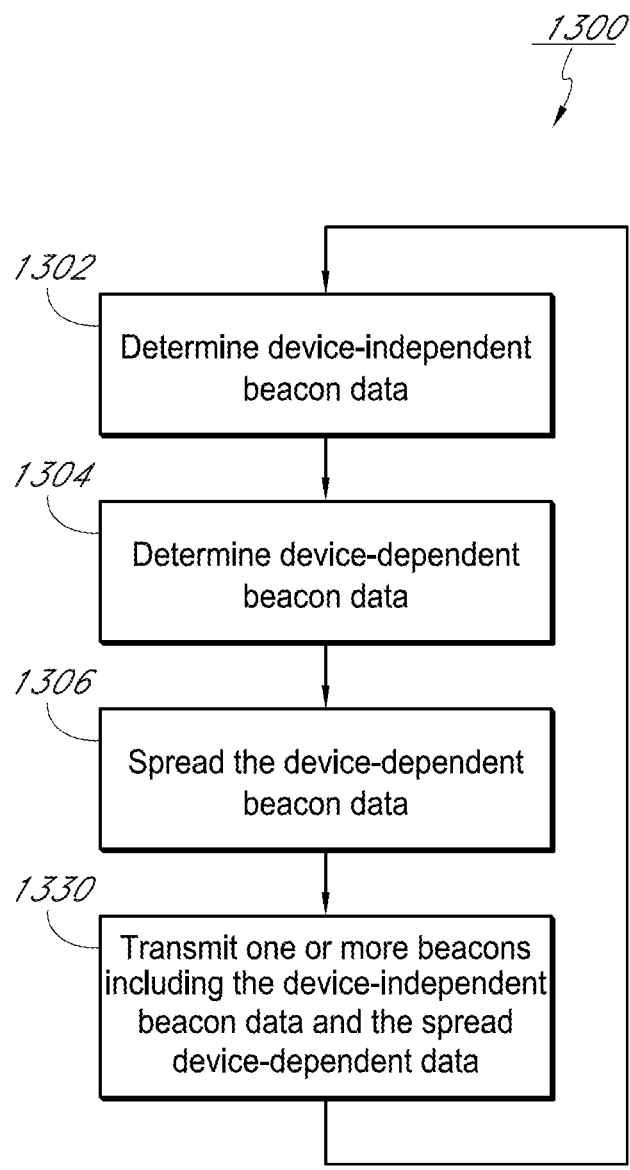
FIG. 13 is a flowchart illustrating a method of communication using beacons comprising device-independent and spread device-dependent data.

FIG. 13 is a flowchart illustrating a method 1300 of communication using beacons comprising device-independent and spread device-dependent data. The method 1300 begins, in block 1302, with the determination of device-independent beacon data. The determination can be performed, for example, by at least one of the processing system 204 or memory 206 of FIG. 2. The device-independent beacon data can include, but is not limited to, a preamble, synchronization information, or network information, such as superframe duration or a network identifier. The device-independent beacon data is independent of the device performing the method 1300; however, the device-independent beacon data may be dependent on the network of which the device is a member. Thus, determining device-independent beacon data can include receiving the device-independent beacon data over a network.

Next, in block 1304, device-dependent beacon data is determined. The determination can be performed, for example, by at least one of the processing system 204 or memory 206 of FIG. 2. The device-dependent beacon data can include, but is not limited to, a time-stamp, a list of neighbors, a device ID, and beam direction information. Unlike the device-independent beacon data, the device-dependent beacon data is dependent on the device performing the method. The device-dependent beacon data may further be dependent on the network of which the device is a member.

Continuing to block 1306, the device-dependent beacon data is spread using one or more spreading codes. The spreading can be performed, for example, by the processing system 204 of FIG. 2. The one or more spreading codes can include, but are not limited to, Golay, Walsh, or pseudonoise (PN) codes.

One or more beacons comprising the device-independent and the spread device-dependent data are transmitting in block 1330. The transmission can be performed, for example, by the transceiver 214 of FIG. 2. In a particular aspect, a beacon is transmitted in each of a plurality of beam directions of the device. Following block 1330, the method 1300 may repeat by returning to block 1302 or end.

Because a device receiving beacons from two or more transmitters, even if overlapping, can combine them to extract at least some of the beacon contents, in one aspect, a beacon transmitting device is configured to transmit one or more beacons at the same time as other devices transmit beacons. Whereas FIG. 10 shows the results of beacon transmission where collisions are avoided, FIG. 14 shows the results of beacon transmission where beacons are transmitted concurrently.

Figure 14:
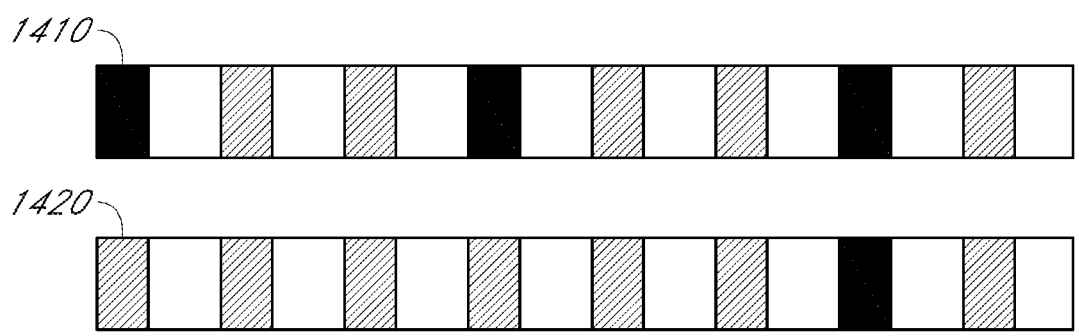
FIG. 14 is a set of timelines for two devices transmitting beacons based on concurrent transmission.

Another example result of the use of the method 600 of FIG. 6 is shown in FIG. 14. FIG. 14 is a set of timelines for two devices transmitting beacons based on concurrent transmission. The timeline for the first device 1410 illustrates that the first device transmits one or more beacons during the first of every three successive beacon periods. As illustrated, the first device transmits one or more beacons during the first, fourth, and seventh beacon transmission period.

If the second device desires to transmit beacons, it senses the channel during the first six beacon transmission period and determines that a beacon is being transmitted every third beacon transmission period and is not being transmitted in between those transmissions. The second device may select one or more beacon transmission periods based on a pattern, such as a periodic pattern, determined by sensing the channel. The timeline for the second device 1420 illustrates that the second device transmits one or more beacons during the seventh beacon transmission period, concurrently with the first device. In one aspect, the second device transmits one or more beacons every third beacon transmission period following the seventh beacon transmission period, i.e., the tenth beacon transmission period, thirteenth beacon transmission period, etc.

In one aspect, beacon transmission periods are selected so as to avoid collision, whereas in other aspects, beacon transmission periods are selected so as to concurrently transmit beacons. In one aspect, these two methods are combined. In one aspect, during certain time intervals, beacons having substantially device-dependent information are transmitted during beacon transmission periods selected so as to avoid collision, whereas during other time intervals, beacons having substantially device-independent information are transmitted during beacon transmission periods selected so as to concurrently transmit beacons with other devices.

Figure 15:
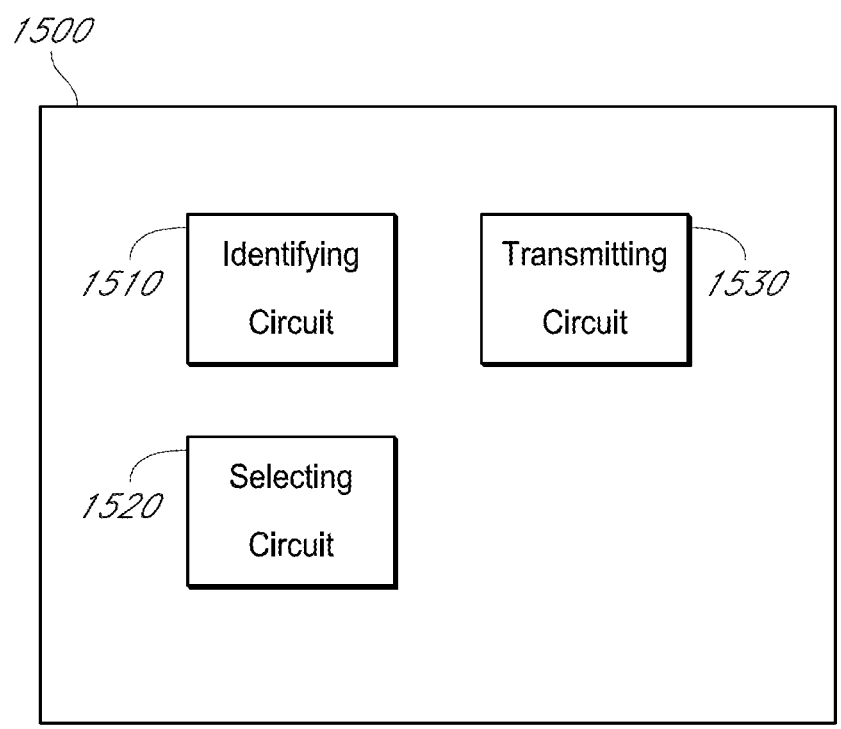
FIG. 15 is a simplified block diagram of a sample aspect of an apparatus configured to provide beacon transmission operations as taught herein.

The functionality described herein (e.g., with regard to one or more of the accompanying figures) may correspond in some aspects to similarly designated "means for" functionality in the appended claims. Referring to FIG. 15, an apparatus 1500 is represented as a series of interrelated functional circuits. An identifying circuit 1510 may correspond at least in some aspects to, for example, a processing system as discussed herein. The identifying circuit 1510 may identify a plurality of successive beacon transmission periods separated by non-beacon transmission periods. Means for identifying may include the identifying circuit 1510. A selecting circuit 1520 may correspond at least in some aspect to, for example, a processing system, as discussed herein. The selecting circuit 1520 may select one or more beacon transmission periods from the plurality of successive beacon transmission periods. The selecting circuit 1520 may select beacon transmission periods randomly or deterministically. The selecting module may select based, at least in part, on information received from other devices, a schedule, carrier sensing, when other devices are scheduled to transmit, a received list of neighboring devices, or other information. Means for selecting may include the selecting circuit 1520. A transmitting circuit 1530 may correspond at least in some aspects to, for example, a processing system, a network interface, an air interface, a transmitter, a transceiver, or one or more antennas, as discussed herein. The transmitting circuit 1530 may transmit one or more beacons during beacon transmission periods. Means for transmitting may include the transmitting circuit 1530.

Figure 16:
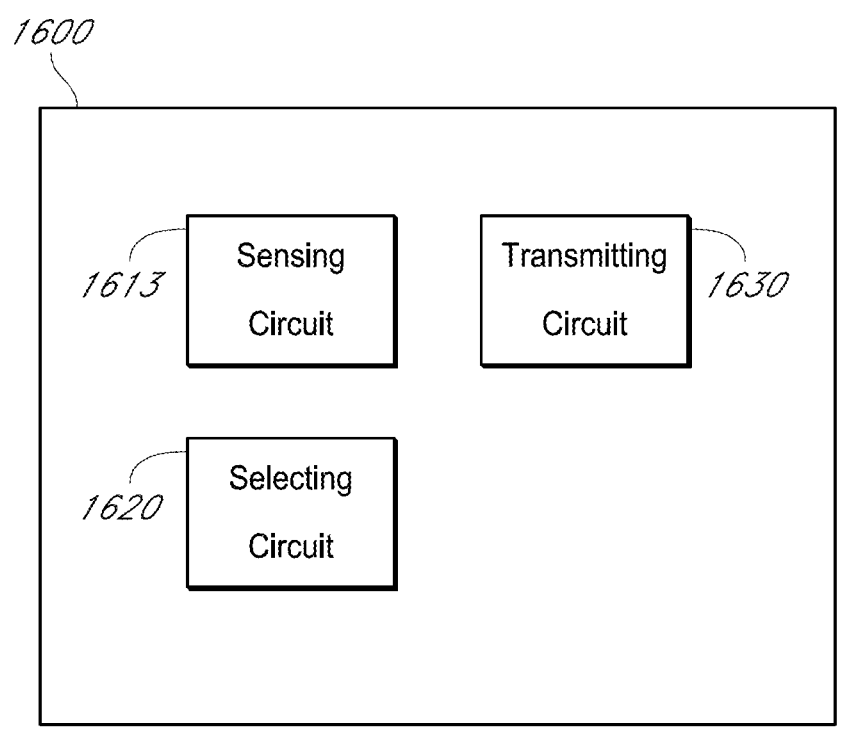
FIG. 16 is a simplified block diagram of another sample aspect of an apparatus configured to provide beacon transmission operations as taught herein.

Referring to FIG. 16, an apparatus 1600 is represented as a series of interrelated functional circuits. A sensing circuit 1613 may correspond at least in some aspects to, for example, a signal detector, a processing system, a network interface, an air interface, a receiver, or one or more antennas, as discussed herein. The sensing circuit 1613 may sense a channel during a first period. Means for sensing may include the sensing circuit 1613. A selecting circuit 1620 may correspond at least in some aspect to, for example, a processing system, as discussed herein. The selecting circuit 1620 may select a second period based on the sensing. Means for selecting may include the selecting circuit 1620. A transmitting circuit 1630 may correspond at least in some aspects to, for example, a processing system, a network interface, an air interface, a transmitter, a transceiver, or one or more antennas, as discussed herein. The transmitting circuit 1630 may transmit one or more beacons during the second period. Means for transmitting may include the transmitting circuit 1630.

Figure 17:
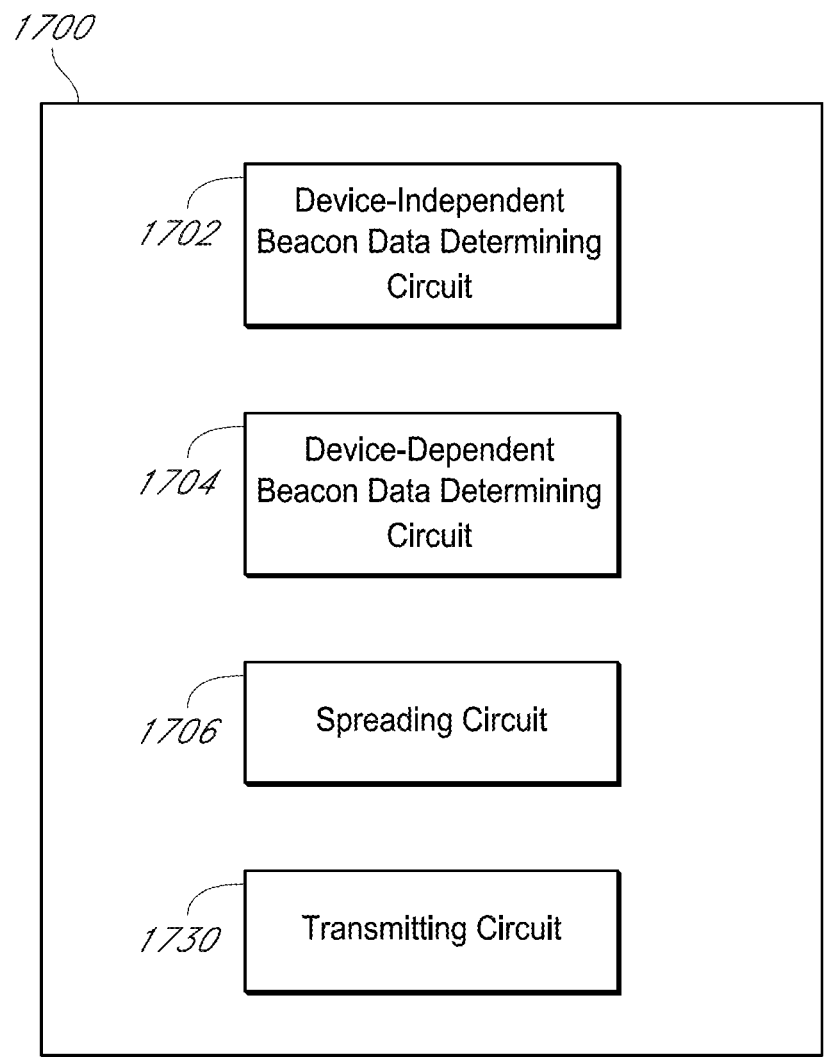
FIG. 17 is a simplified block diagram of yet another sample aspect of an apparatus configured to provide beacon transmission operations as taught herein.

Referring to FIG. 17, an apparatus 1700 is represented as a series of interrelated functional circuits. A device-independent beacon data determining circuit 1702 may correspond at least in some aspect to, for example, a processing system, as discussed herein. The device-independent beacon data determining circuit 1702 may determine device-independent beacon data. Means for determining device-independent beacon data may include the device-independent beacon data determining circuit 1702. A device-dependent beacon data determining circuit 1704 may correspond at least in some aspect to, for example, a processing system, as discussed herein. The device-dependent beacon data determining circuit 1704 may determine device-dependent beacon data. Means for determining device-dependent beacon data may include the device-dependent beacon data determining circuit 1704. A spreading circuit 1706 may correspond at least in some aspects to, for example, a processing system, as discussed herein. The spreading circuit 1706 may spread data using one or more spreading codes. Means for spreading may include the spreading circuit 1706. A transmitting circuit 1730 may correspond at least in some aspects to, for example, a processing system, a network interface, an air interface, a transmitter, a transceiver, or one or more antennas, as discussed herein. The transmitting circuit 1730 may transmit one or more beacons during the second period. Means for transmitting may include the transmitting circuit 1730.

The functionality of the modules described with respect to FIG. 19 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects, one or more of any dashed blocks in FIG. 19 or other Figures are optional.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, or any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials.

In the hardware implementation described above, the computer-readable media may be part of the device or separate from the device. However, as those skilled in the art will readily appreciate, the computer-readable media may be external to the device. By way of example, the computer-readable media may include a transmission line, a carrier wave modulated by data, and/or a computer product separate from the wireless node, all which may be accessed by the processing system 204. Alternatively, or in addition to, the computer readable media, or any portion thereof, may be integrated into the processing system 204, such as the case may be with cache and/or general register files.

The processing system, or any part of the processing system, may provide the means for performing the functions recited herein. By way of example, the processing system executing instructions or code may provide the means for identifying a plurality of successive beacon transmission periods separated by at least one non-beacon transmission period, means for selecting one or more beacon transmission periods from the plurality of successive beacon transmission periods, means for transmitting one or more beacons during each of the selected beacon transmission periods, means for receiving data regarding reception of a beacon by a device, wherein the means for selecting selects the one or more beacon transmission periods based on the received data, means for sensing a channel during a first portion of a defined beacon transmission period, means for transmitting, based on the sensing and during a second portion of the defined beacon transmission period, a plurality of beacons via a respective plurality of beam patterns, means for sensing a channel for at least a first beacon transmission period, means for selecting, based on the sensing, a second beacon transmission period which is subsequent to a non-beacon transmission period, wherein the non-beacon transmission period is subsequent to the first beacon transmission period, means for transmitting one or more beacons during the second beacon transmission period, means for determining device-independent beacon data, means for determining device-dependent beacon data, means for spreading the device-dependent beacon data using one or more spreading codes, means for transmitting one or more beacons during a beacon transmission period, wherein each beacon comprises the device-independent beacon data and the spread device-dependent beacon data, and/or means for storing beacon data Alternatively, the code on the computer-readable medium, or the computer-readable medium itself, may provide the means for performing the functions recited herein.

Those skilled in the art will recognize how best to implement the described functionality presented throughout this disclosure depending on the particular application and the overall design constraints imposed on the overall system.

It is understood that any specific order or hierarchy of steps described in the context of a method or software module is being presented to provide an examples of a wireless node. Based upon design preferences, it is understood that the specific order or hierarchy of steps may be rearranged while remaining within the scope of the invention.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of communication by a wireless device, the method comprising:
    determining network-dependent beacon data comprising information dependent on a network of which the wireless device is a member, the network-dependent beacon data being the same for beacons transmitted from at least two different devices in the network;
    determining device-dependent beacon data comprising information dependent on the wireless device, the device-dependent beacon data being different for beacons transmitted from different devices in the network;
    spreading the device-dependent beacon data using one or more spreading codes; and
    transmitting one or more beacons during a beacon transmission period, wherein each beacon comprises the unspread network-dependent beacon data and the spread device-dependent beacon data.

2. The method of claim 1, wherein at least one of determining network-dependent beacon data or determining device-dependent beacon data comprises accessing beacon data from a memory.

3. The method of claim 1, wherein determining network-dependent beacon data comprises receiving the network-dependent beacon data over a network.

4. The method of claim 1, wherein the network-dependent beacon data comprises at least one of synchronization information, network information, a superframe duration, or a network identifier.

5. The method of claim 1, wherein the device-dependent beacon data comprises at least one of a time-stamp, a list of neighbors, or an apparatus identification number.

6. The method of claim 1, wherein spreading the device-dependent beacon data comprises spreading the device-dependent data using a Golay, Walsh, or pseudonoise code.

7. The method of claim 1, wherein spreading the device-dependent beacon data comprises using one or more device-dependent spreading codes.

8. The method of claim 1, further comprising spreading the network-dependent beacon data using one or more network-dependent spreading codes.

9. An apparatus for communication, the apparatus comprising:
    a processing system configured to determine network-dependent beacon data comprising information dependent on a network of which the apparatus is a member, determine device-dependent beacon data comprising information dependent on the apparatus, and to spread the device-dependent beacon data using one or more spreading codes, the network-dependent beacon data being the same for beacons transmitted from at least two different devices in the network, and the device-dependent beacon data being different for beacons transmitted from different devices in the network; and
    a transmitter configured to transmit one or more beacons during a beacon transmission period, wherein each beacon comprises the unspread network-dependent beacon data and the spread device-dependent beacon data.

10. The apparatus of claim 9, wherein the processing system determines at least one of network-dependent beacon data or device-dependent beacon data by accessing beacon data from a memory.

11. The apparatus of claim 9, wherein the processing system determines network-dependent beacon data by receiving the network-dependent beacon data over a network.

12. The apparatus of claim 9, wherein the network-dependent beacon data comprises at least one of a preamble, synchronization information, or network information, a superframe duration, or a network identifier.

13. The apparatus of claim 9, wherein the device-dependent beacon data comprises at least one of a time-stamp, a list of neighbors, or an apparatus identification number.

14. The apparatus of claim 9, wherein the processing system is configured to spread the device-dependent beacon data using a Golay, Walsh, or pseudonoise code.

15. The apparatus of claim 9, wherein the processing system spreads the device-dependent beacon data using one or more device-dependent spreading codes.

16. The apparatus of claim 9, wherein the processing system is configured to spread the network-dependent beacon data using one or more network-dependent spreading codes.

17. An apparatus for communication, the apparatus comprising:
    means for determining network-dependent beacon data comprising information dependent on a network of which the apparatus is a member, the network-dependent beacon data being the same for beacons transmitted from at least two different devices in the network;
    means for determining device-dependent beacon data comprising information dependent on the apparatus, the device-dependent beacon data being different for beacons transmitted from different devices in the network;
    means for spreading the device-dependent beacon data using one or more spreading codes; and
    means for transmitting one or more beacons during a beacon transmission period, wherein each beacon comprises the unspread network-dependent beacon data and the spread device-dependent beacon data.

18. The apparatus of claim 17, wherein at least one of the means for determining network-dependent beacon data or the means for determining device-dependent beacon data comprises means for accessing beacon data from means for storing beacon data.

19. The apparatus of claim 17, wherein the means for determining network-dependent beacon data comprises means for receiving the network-dependent beacon data over a network.

20. The apparatus of claim 17, wherein the network-dependent beacon data comprises at least one of synchronization information, network information, a superframe duration, or a network identifier.

21. The apparatus of claim 17, wherein the device-dependent beacon data comprises at least one of a time-stamp, a list of neighbors, or an apparatus identification number.

22. The apparatus of claim 17, wherein the means for spreading comprises means for spreading the device-dependent beacon data using a Golay, Walsh, or pseudonoise code.

23. The apparatus of claim 17, wherein the means for spreading comprises means for spreading the device-dependent beacon data using one or more device-dependent spreading codes.

24. The apparatus of claim 17, wherein the means for spreading comprises means for spreading the network-dependent beacon data using one or more network-dependent spreading codes.

25. A wireless node comprising:
a processing system configured to determine network-dependent beacon data comprising information dependent on a network of which the wireless node is a member, determine device-dependent beacon data comprising information dependent on the wireless node, and spread the device-dependent beacon data using one or more spreading codes, the network-dependent beacon data being the same for beacons transmitted from at least two different devices in the network, and the device-dependent beacon data being different for beacons transmitted from different devices in the network;
at least one antenna; and
a transmitter configured to transmit, via the at least one antenna, one or more beacons during a beacon transmission period, wherein each beacon comprises the unspread network-dependent beacon data and the spread device-dependent beacon data.

26. A computer program product comprising a computer readable storage device comprising instructions stored therein that when executed cause an apparatus to perform operations comprising:

determining network-dependent beacon data comprising information dependent on a network of which the apparatus is a member, the network-dependent beacon data being the same for beacons transmitted from at least two different devices in the network;
determining device-dependent beacon data comprising information dependent on the apparatus, the device-dependent beacon data being different for beacons transmitted from different devices in the network;
spreading the device-dependent beacon data using one or more spreading codes; and
transmitting one or more beacons during a beacon transmission period, wherein each beacon comprises the unspread network-dependent beacon data and the spread device-dependent beacon data.

27. The method of claim 1, further comprising determining a schedule for transmitting beacons in the network, wherein spreading only the device-dependent beacon data is performed when transmission of the one or more beacons is to occur concurrently with a transmission of a beacon from a different wireless device in the network according to the determined schedule.

28. The apparatus of claim 9, wherein the processing system is configured to determine a schedule for transmitting beacons in the network, and to spread only the device-dependent beacon data when transmission of the one or more beacons is to occur concurrently with a transmission of a beacon from a different wireless device in the network according to the determined schedule.

29. The apparatus of claim 17, further comprising means for determining a schedule for transmitting beacons in the network, wherein the means for spreading only the device-dependent beacon data is configured to perform spreading when transmission of the one or more beacons is to occur concurrently with a transmission of a beacon from a different wireless device in the network according to the determined schedule.

* * * * *